(12) United States Patent
Kakumoto

(10) Patent No.: US 9,939,801 B2
(45) Date of Patent: Apr. 10, 2018

(54) WORK PROCESSING METHOD, SPINDLE ANGLE CORRECTION DEVICE, AND COMPLEX LATHE

(71) Applicant: NAKAMURA-TOME PRECISION INDUSTRY CO., LTD., Hakusan-shi, Ishikawa (JP)

(72) Inventor: Masahiko Kakumoto, Hakusan (JP)

(73) Assignee: NAKAMURA-TOME PRECISION INDUSTRY CO., LTD., Hakusan-Shi, Ishikawa (JP)

(*) Notice: Subject to any disclaimer, the term of this patent is extended or adjusted under 35 U.S.C. 154(b) by 0 days.

(21) Appl. No.: 15/602,144

(22) Filed: May 23, 2017

(65) Prior Publication Data

US 2017/0343978 A1 Nov. 30, 2017

(30) Foreign Application Priority Data

May 27, 2016 (JP) .................... 2016-106371

(51) Int. Cl.
*B23Q 17/20* (2006.01)
*G05B 19/31* (2006.01)
(Continued)

(52) U.S. Cl.
CPC .......... *G05B 19/311* (2013.01); *B23B 25/06* (2013.01); *B23Q 15/26* (2013.01); *B23Q 17/20* (2013.01);
(Continued)

(58) Field of Classification Search
CPC .... G05B 19/19; G05B 19/195; G05B 19/311; G05B 19/251; G05B 19/416;
(Continued)

(56) References Cited

U.S. PATENT DOCUMENTS

| 4,350,939 A * | 9/1982 | Rodriguez | ............. B23Q 15/26 318/592 |
| 9,873,174 B2 * | 1/2018 | Asano | ................... B23Q 15/14 |

(Continued)

FOREIGN PATENT DOCUMENTS

| DE | 102009011682 A1 | 7/2010 |
| JP | H102292141 A | 12/1990 |

(Continued)

OTHER PUBLICATIONS

European Search Report in corresponding European Application No. 17172697.9 dated Oct. 26, 2017.

*Primary Examiner* — Will Fridie, Jr.
(74) *Attorney, Agent, or Firm* — Bacon & Thomas, PLLC

(57) ABSTRACT

A first speed and a second speed slower than the first speed are set as a contact speed when a work w and a detection jig t attached to a tool post are brought into contact with each other to detect a position or a posture of the work w, the work and the detection jig are brought into contact with each other at the first speed, the detection jig and the work contacting each other are separated from each other by a predetermined distance, the work and the detection jig which are separated from each other are brought into contact with each other at the same position at the second speed, and a correction value δ is obtained based on a tool post position or a spindle angle during the second contact.

5 Claims, 5 Drawing Sheets

(51) Int. Cl.
*B23Q 15/26* (2006.01)
*B23Q 17/22* (2006.01)
*B23B 25/06* (2006.01)
*G05B 19/416* (2006.01)

(52) U.S. Cl.
CPC ....... *B23Q 17/225* (2013.01); *B23Q 17/2258* (2013.01); *G05B 19/416* (2013.01); *G05B 2219/36204* (2013.01)

(58) Field of Classification Search
CPC ...... G05B 19/402; B23Q 15/26; B23Q 17/20; B23Q 17/2233; B23Q 17/2241; B23Q 17/225; B23Q 17/2258; B23Q 17/2266; B23Q 17/2275; B23B 25/06
See application file for complete search history.

(56) References Cited

U.S. PATENT DOCUMENTS

| | | | | |
|---|---|---|---|---|
| 2009/0183610 | A1* | 7/2009 | Maxted | G05B 19/401 82/1.11 |
| 2010/0138006 | A1* | 6/2010 | Mies | B23Q 15/26 700/57 |
| 2010/0241267 | A1* | 9/2010 | Nishikawa | B23Q 17/20 700/195 |
| 2010/0288089 | A1* | 11/2010 | Miyamoto | B23B 5/08 82/118 |
| 2011/0251714 | A1* | 10/2011 | Nishikawa | B23Q 17/20 700/174 |
| 2017/0239766 | A1* | 8/2017 | Satou | B23P 23/02 |
| 2017/0297160 | A1* | 10/2017 | Matsushita | B23Q 17/2233 |

FOREIGN PATENT DOCUMENTS

| | | |
|---|---|---|
| JP | H04330504 A | 11/1992 |
| JP | H0655415 A | 3/1994 |
| JP | H10671692 A | 3/1994 |
| JP | H8-112754 A | 5/1996 |
| JP | H11165241 A | 6/1999 |
| JP | 2007-98489 A | 4/2007 |

* cited by examiner

WORK PROCESSING METHOD, SPINDLE ANGLE CORRECTION DEVICE, AND COMPLEX LATHE

TECHNICAL FIELD

The present invention relates to a method of detecting a dimension or a posture of a work loaded into a tool machine and processing the work based on a detection value, a device suitable for performing the method, and a complex lathe including the device.

BACKGROUND ART

A method of detecting a position or a posture of each work loaded into a tool machine, correcting a reference coordinate of a tool post or a reference angle of a spindle based on a detection value, and processing the work is widely performed at the time of processing the work by the tool machine.

As a structure of detecting a position or a posture of the work while not using a measurement unit such as a touch probe or a camera installed in a machine, a structure in which a rigid member (hereinafter, referred to as a "detection jig") such as a round bar having a simple shape is attached to a tool post and a position or a posture of the work is detected based on a tool post position when the detection jig contacts the work is practically used. This structure is particularly useful for a tool machine including a turret tool post.

The contact between the detection jig attached to the tool post and the work can be detected by detecting an increase in load of a motor driving the tool post, a spindle, a work table, and the like. An increase in load of the motor can be detected by an increase in current value of the motor. As disclosed in Patent Documents 1 and 2, when the tool machine is an NC tool machine, the contact between the detection jig and the work can be detected with higher accuracy by detecting an increase in position deviation which is a difference signal between a tool post position instruction given to the motor and a feedback signal returned from the motor.

Patent Document 2 discloses a method of setting a reference angle of the spindle from two contact angles between the work and the detection jig at a D-shaped cross-section portion which obtained by scraping off a part of a cylindrical peripheral surface into a flat surface. The two contact angles are obtained the spindle rotates normally and reversely at the time of setting the reference angle.

CITATION LIST

Patent Documents

Patent Document 1: JP 06-55415 A
Patent Document 2: JP 11-165241 A
Patent Document 3: JP 04-330504 A
Patent Document 4: JP 02-292147 A
Patent Document 5: JP 06-71692 A

SUMMARY OF THE INVENTION

Problem to be Solved by the Invention

When the position or the posture of the work is detected by the contact between the work and the detection jig, there is a need to appropriately set a speed (hereinafter, referred to as a "contact speed") when the work and the detection jig move close to each other to contact each other. The contact speed needs to be changed in accordance with the required processing accuracy or the shape of the work within a speed range not giving damage to the work or the machine even when the contact (the collision) between the work and the detection jig is repeated, but it is difficult to technically set the contact speed.

That is, when the detection accuracy is considered as an important factor, the contact speed needs to be set to a slow speed. However, when the movement distance necessary for the detection is long, a time necessary for the detection increases and thus a problem arises in that productivity is degraded. Meanwhile, when the productivity is important, the contact speed has to be set to a fast speed, but a problem arises in that an impact sound becomes louder or detection accuracy becomes degraded at the time of the contact.

When a plurality of works are continuously processed by the lathe, it is typically difficult to detect a spindle rotation angle of the work loaded by a loader or a bar feeder. That is, when the work is loaded by the work loader, the position of the work in the spindle direction can be defined in such a manner that the end of the work is brought into contact with an inner end of the chuck. Further, when the work is loaded by the bar feeder, the position of the work in the spindle direction can be defined in such a manner that a stopper is attached to the tool post and a front end of a bar carried into a machine is brought into contact with the stopper of the tool post waiting at a predetermined position.

However, it is not possible to define the posture (the angle) of the work rotating about the spindle in any case. If only turning is performed, any severe problem does not occur. However, in a complex lathe which performs drilling or planar processing on a peripheral surface of a work by a rotation tool such as a drill or a milling tool attached to the tool post, there is a need to detect the spindle rotation posture of the work loaded to the lathe at the time of processing a work of which a part of a peripheral surface is notched or a work which has a polygonal cross-section.

Here, an object of the invention is to more appropriately set a contact speed in response to required detection accuracy or a shape of a work in a case where detection accuracy or productivity is important by improving the technique disclosed in Patent Document 2.

Means for Solving Problem

The invention solves the above-described problems by a configuration in which a first speed and a second speed slower than the first speed are settable as a contact speed at the time of detecting a position or a posture of a work W by a contact between the work w loaded to a tool machine and a detection jig t attached to a tool post 12 and a contact position is detected by two steps of contact operations.

A work processing method of the invention relates to improvement in a work processing method of a lathe which brings the detection jig t corresponding to the rigid member attached to the tool post 12 into contact with the work w attached to a spindle 11 by the movement of the tool post 12 or the rotation of the spindle 11 in the lathe, corrects a position of the tool post 12 or an angle of the spindle 11 based on the position of the tool post 12 or the angle of the spindle 11 during the contact, and processes the work w.

In the invention, the contact is performed by a first contact operation of driving the tool post or the spindle at a first speed set to a setter to bring the work w and the detection jig t into contact each other, a return operation of separating the detection jig t and the work w from each other by a predetermined distance after the first contact operation, and a second contact operation of bringing the work and the detection jig into contact with each other at the same position at a second speed slower than the first speed after the separation operation, and the correction is performed by obtaining a correction value δ based on the position of the tool post 12 or the spindle angle during the second contact.

The invention can be also employed when the tool post 12 is moved so that the work w and the detection jig t contact each other and a position of the tool post 12 is corrected when the work is processed based on the tool post position at the time of the contact. However, the invention is particularly useful for a case where the work w and the detection jig t are brought into contact with each other by the rotation of the spindle 11 and the spindle angle is corrected at the time of processing the work based on the spindle angle during the contact due to the above-described reasons.

A spindle angle correction device which is desirable for performing the spindle angle correction method of the invention is a device including a tool post movement member 51 which includes a detection position setter for setting a position of the detection jig t during the operation of detecting the work w, a collision load setter, a retraction position setter setting a tool post retraction position during a retry after a collision is detected, and a rotation angle setter setting a spindle rotation angle during the retry, a spindle rotation member 52 which includes a first speed setter, a second speed setter, and a return angle setter, a contact detection member 53 which includes a contact load setter, and a correction value calculation unit 54 which calculates a spindle angle correction value δ based on the spindle angle when the contact is detected.

The tool post movement member 51 of the device moves the tool post of an NC machine 2 to the work detection position when receiving a work loading completion signal d from a controller 6 of a loader or a bar feeder. Then, whenever the feed motor load of the tool post reaches the load set in the collision load setter during the movement of the tool post 12, a retry operation of moving the tool post to a position set in the detection position setter by rotating the spindle by an angle set in the rotation angle setter after retracting the tool post 12 to a position set in the retraction position setter is performed.

The spindle rotation member 52 and the contact detection member 53 transmit a low-speed rotation instruction i of rotating the spindle at a speed set in the first speed setter when receiving a movement completion signal h of the tool post 12 toward a position e set in the detection position setter of the tool post movement member 51 from a tool post control unit 21 of the NC machine 2. When the spindle motor load reaches the load set in the contact load setter during the rotation, a micro-speed rotation instruction j of rotating the spindle back by an angle set in the return angle setter and rotating the spindle at the speed set in the second speed setter is transmitted. Then, when the spindle motor load reaches the load set in the contact load setter, a contact detection signal k is output.

The correction value calculation unit 54 calculates the spindle angle correction value δ based on the spindle angle θ when the contact detection signal k is output and sets the spindle angle correction value to the correction value memory 23 of the NC machine.

Effect of the Invention

As the first speed, a fast speed is set within a speed range not giving damage to the machine or the work even when an impact caused by the contact between the work w and the detection jig t is repeated in response to the material or the shape of the work and the structure or the accuracy of the machine. As the second speed, a speed capable of realizing the required detection accuracy is set in response to the required processing accuracy or the accuracy of the surface of the work contacting the detection jig.

When the second speed is set to be lower, the work can be detected with higher accuracy. For example, when the second speed is set to 200 mm/min in the tool machine controlled by the NC machine 2 outputting a detection pulse every four milliseconds, an equation of 200/60/1000*4=0.013 mm is obtained. Thus, the contact position can be detected with the accuracy of 13μ (micron). Then, when the second speed is set to 100 mm/min, the contact position can be detected with the accuracy of 6.5μ.

When the contact is detected in two steps of the first speed and the second speed, the return operation is necessary between the first contact and the second contact. However, since the work and the detection jig can be also regarded as rigid members even when a driving system is taken into consideration, the return operation may be performed in an extremely small distance to a processing level or so which can be realized. Then, a time necessary for the return operation and the contact operation at the second speed can be set to a short time which can be ignored.

Thus, when the first speed is set to, for example, 600 mm/min, a time necessary for the detection can be shortened by about ⅓ compared to a case where the detection is performed in one step at 200 mm/min. Conventionally, the contact speed is set to about 200 mm/min. Thus, when the first speed is set to about 500 to 800 mm/min and the second speed is set to about 200 mm/min, the detection time can be shortened. Further, when the second speed is set to a value slower than 200 mm/min, for example, 100 to 50 mm/min, the detection can be performed with high accuracy.

Further, when the impact caused by the contact is not desirable in the case of the high-accuracy detection using the high-accuracy machine, the first speed can be set to about 200 mm/min and the second speed can be set to 100 to 50 mm/min. In this way, various settings can be performed in response to the machine or the work. Accordingly, there is an effect that the detection time can be shortened while high detection accuracy is realized.

MODE(S) FOR CARRYING OUT THE INVENTION

Figure 1:
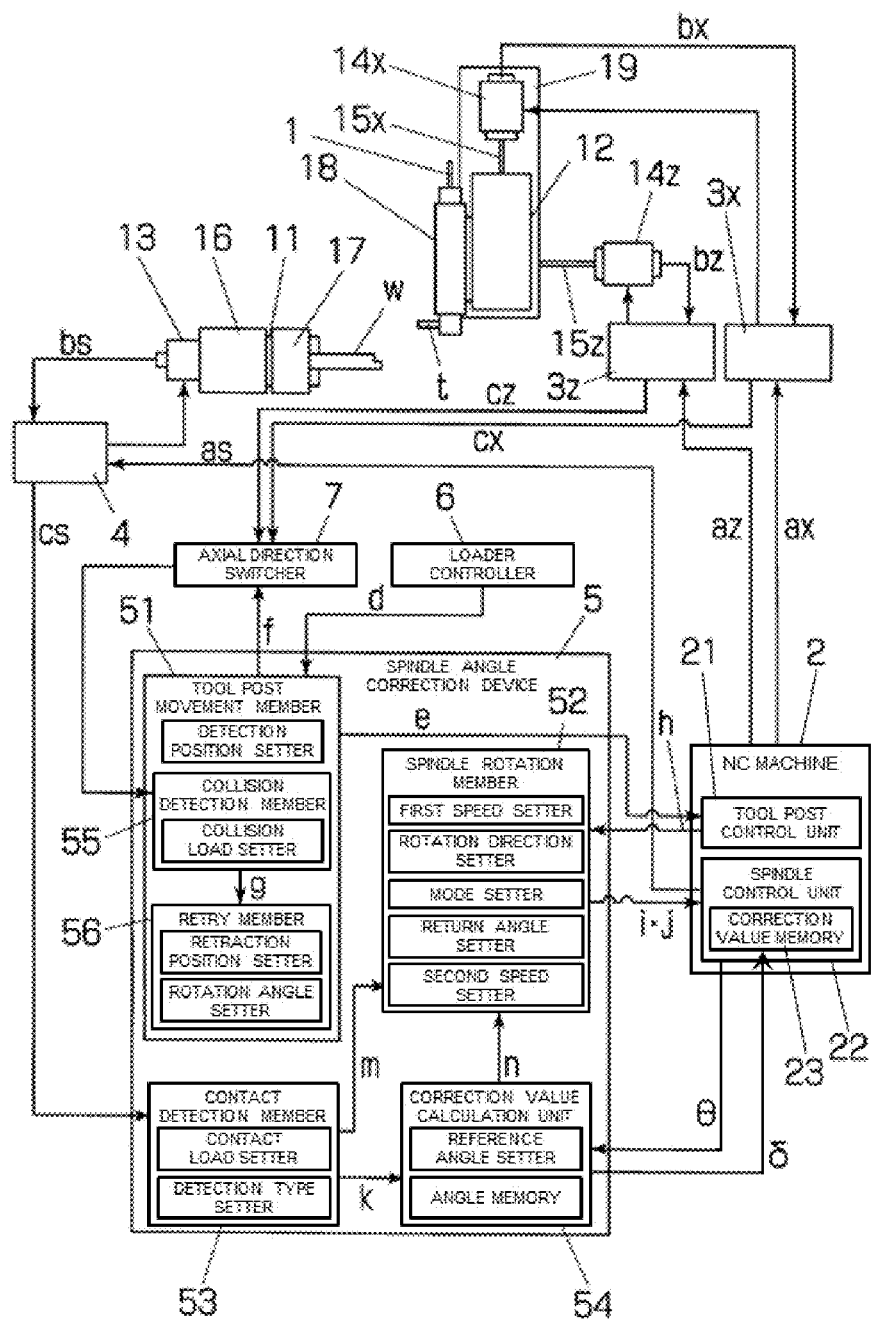
FIG. 1 is a block diagram showing a main part of a complex lathe and a spindle angle correction device.

FIG. 1 is a diagram showing a main part of a complex lathe including a turret tool post 12 capable of attaching a rotation tool 1 thereto. A spindle 11 of the lathe is axially supported by a spindle table 16 which is substantially integrated with a bed (not shown), a spindle motor 13 is connected to a base end thereof, and a chuck 17 is attached to a front end thereof.

The tool post 12 including a turret 18 is attached to a sliding table 19, which is slidable in a spindle direction (a Z-axis direction), so as to be slidable in a direction (an X-axis direction) orthogonal to the spindle and feed screws 15$z$ and 15$x$ which are respectively driven in normal and reverse directions by a Z-axis feed motor 14$z$ and an X-axis feed motor 14$x$ are threaded into the sliding table 19 and the tool post 12. A detection jig (a work detection member) t which is formed as a round bar processed at one position of the tool attachment station to have an accurate outer diameter dimension is attached to the turret 18.

The Z-axis feed motor 14$z$, the X-axis feed motor 14$x$ and the spindle motor 13 are controlled by a tool post control unit 21 and a spindle control unit 22 of the NC machine 2 through a servo control device 3 (3$z$, 3$x$) and a spindle motor control device 4.

Position instructions a (ax, az, as) for the motors and position feedback signals b (bx, bz, bs) from the motors receiving the corresponding instructions are given to the servo control device 3 and the spindle motor control device 4 and position deviations c (cx, cz, cs) which are difference signals thereof are output therefrom. Since the position deviation c becomes a value which is proportional to a load of each motor, the load of each motor can be detected by the position deviation c.

A spindle angle correction device 5 of the invention includes a tool post movement member 51, a spindle rotation member 52, a contact detection member 53, and a correction value calculation unit 54. The tool post movement member 51 includes a detection position setter, a collision detection member 55, and a retry member 56.

When the tool post movement member 51 receives a work loading completion signal d from a controller 6 of a loader or a bar feeder, a positional determination instruction e of moving the tool post 12 to a position set in the detection position setter is transmitted to the tool post control unit 21 of the NC machine. The tool post movement member 51 transmits a direction signal f (indicating the X-axis direction or the Z-axis direction) at the time of inserting the detection jig t into recessed portions 31 and 33 (FIGS. 2 and 3) of the work to an axial direction switcher 7. The axial direction switcher 7 switches a position deviation (a load signal) transmitted to the collision detection member 55 to cx or cz in response to the feeding axis direction.

The tool post control unit 21 moves the tool post 12 to a position instructed by the positional determination instruction e. Due to the uncertain spindle rotation angle of the work loaded to the chuck 17, there is a possibility that the detection jig t is not inserted into the recessed portions 31 and 33 (FIGS. 2 and 3) of the work w to thereby cause a collision with an end surface or a peripheral surface of the work w (an undesirable contact between the work w and the detection jig t) during this movement. The collision detection member 55 compares a load of the tool post feed motor 14 (14$x$ or 14$z$) with a load set in the collision load setter of the collision detection member 55 during the movement of the tool post 12 and transmits a collision detection signal g to the retry member 56 when the load of the feed motor 14 exceeds the setting load.

The retry member 56 which receives the collision detection signal g moves the tool post 12 to a position set in a retraction position setter in the NC machine 2, rotates the spindle 11 by an angle set in the rotation angle setter, and resumes an operation of moving the tool post 12 to a position set in the detection position setter of the tool post movement member 51. The retry member 56 performs the above-described operation whenever receiving the collision detection signal.

Figure 2:
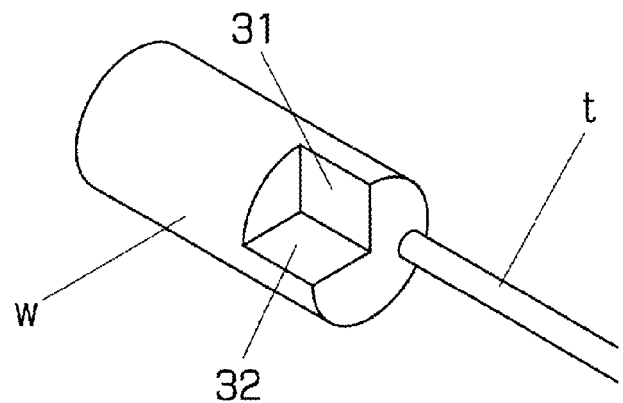
FIG. 2 is a perspective view showing an example of a one-side detection work.
Figure 3:
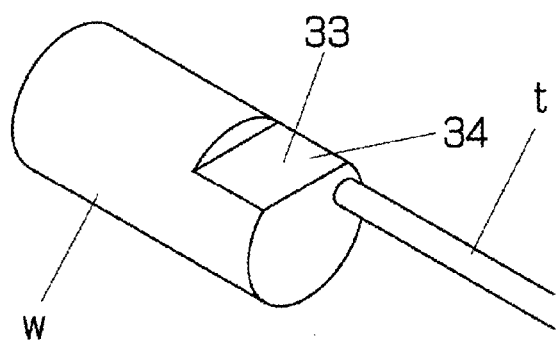
FIG. 3 is a perspective view showing an example of a both-side detection work.

When the collision is prevented and the tool post 12 completely moves to a position set in the detection position setter (a position of the detection jig t inserted into the recessed portions 31 and 33 of the work in the examples of FIGS. 2 and 3), the NC machine 2 transmits a movement completion signal h to the spindle rotation member 52. The spindle rotation member 52 which receives the completion signal h transmits a low-speed rotation instruction i to the spindle control unit 22 of the NC machine and rotates the spindle 11 in a direction set in the rotation direction setter at a speed set in a first speed setter. The spindle rotation member 52 includes a mode setter. The mode setter is a setter which sets a both-detection or a one-side detection.

The contact detection member 53 includes a contact load setter and a detection type setter which sets a high-accuracy detection or a normal detection. A position deviation cs which is generated from the spindle motor control device 4 is input to the contact detection member 53 and the position deviation cs also increases when the load of the spindle motor 13 increases.

When the position deviation cs generated from the spindle motor control device 4 reaches a load set in the contact load setter, the contact detection member 53 transmits a spindle stop signal to the spindle control unit 22 of the NC machine. When the normal detection is set in the detection type setter, a contact detection signal k is transmitted to the correction value calculation unit 54 at the same time.

Meanwhile, if the position deviation cs reaches the load set in the contact load setter when the high-accuracy detection is set in the detection type setter, the contact detection member 53 transmits a high-accuracy detection instruction m to the spindle rotation member 52.

The spindle rotation member 52 which receives the high-accuracy detection instruction m transmits a micro-speed rotation instruction j to the spindle control unit 22, rotates the spindle 11 by an angle set in the return angle setter in a direction opposite to the direction set in the rotation direction setter, and rotates the spindle 11 in a direction set in the rotation direction setter at a speed set in a second speed setter. A speed (a second speed) which is lower than a speed (a first speed) set in the first speed setter is set in the second speed setter.

When the position deviation cs reaches the load set in the contact load setter while the spindle motor rotates at the second speed, the contact detection member 53 transmits the spindle stop signal to the NC machine 2 and transmits the contact detection signal k to the correction value calculation unit 54.

The correction value calculation unit 54 which receives the contact detection signal k receives a spindle angle θ at that time from the NC machine 2, and calculates a correction value δ which is a difference in angle with respect to the angle of the reference angle setter so as to set to the correction value memory of the NC machine 2, if the one-side detection is set in the mode setter of the spindle rotation member 52.

When the both-side detection is set in the mode setter and an angle memory is empty, a spindle angle θ at that time is stored in the angle memory and an opposite detection instruction n is transmitted to the spindle rotation member 52.

The spindle rotation member 52 that receives the opposite detection instruction n from the correction value calculation unit 54 transmits the low-speed rotation instruction i by reversing the setting of the rotation direction setter, detects a contact between the work w and the detection jig t during a reverse rotation in the same procedure as the above-described procedure in corporation with the contact detection member 53, and transmits the contact detection signal k to the correction value calculation unit 54.

The correction value calculation unit 54 which receives the contact detection signal k while a value is registered in the angle memory calculates the correction value δ from the spindle angle θ at that time, the angle stored in the angle memory, and the reference angle set in the reference angle setter, sets the correction value to the correction value memory 23 of the NC machine 2, and returns the setting direction of the rotation direction setter to an original direction.

The NC machine 2 which sets the correction value δ to the correction value memory 23 processes the work by setting a position in which the spindle rotates from the reference angle by a set value to the reference angle or correcting the spindle angle instructed by a processing program using a correction value.

When the work to be processed is processed based on one wall surface 32 of the recessed portion 31 shown in FIG. 2, the one-side detection is set in the mode setter and the spindle rotation direction in which the detection jig positioned into the recessed portion 31 is brought into contact with the wall surface 32 is set in the rotation direction setter. Then, the high-accuracy detection is set in the accuracy type setter when the detection needs to be performed with high accuracy and the normal detection is set in the accuracy type setter when the detection needs to be performed with normal accuracy.

Figure 4:
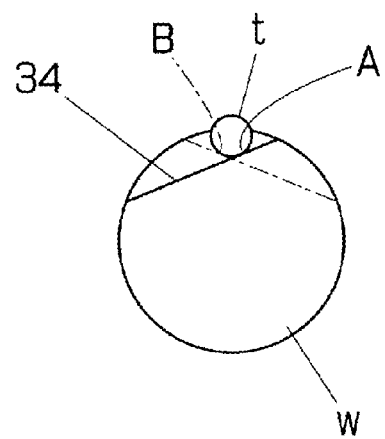
FIG. 4 is a front view showing a relation between a work and a detection jig during a both-side detection.

When the work to be processed is processed based on both contact positions A and B of the recessed portion as in the work which is processed based on a chamfered surface 34 of the recessed portion (the chamfered portion of the peripheral surface) shown in FIGS. 3 and 4, the both-side detection is set in the mode setter and the spindle rotation direction in which the detection jig positioned into the recessed portion 33 first contacts is set in the rotation direction setter. In the same way as the one-side detection, the high-accuracy detection is set in the accuracy type setter when the detection needs to be performed with high accuracy and the normal detection is set in the accuracy type setter when the detection needs to be performed with normal accuracy.

Figure 5:
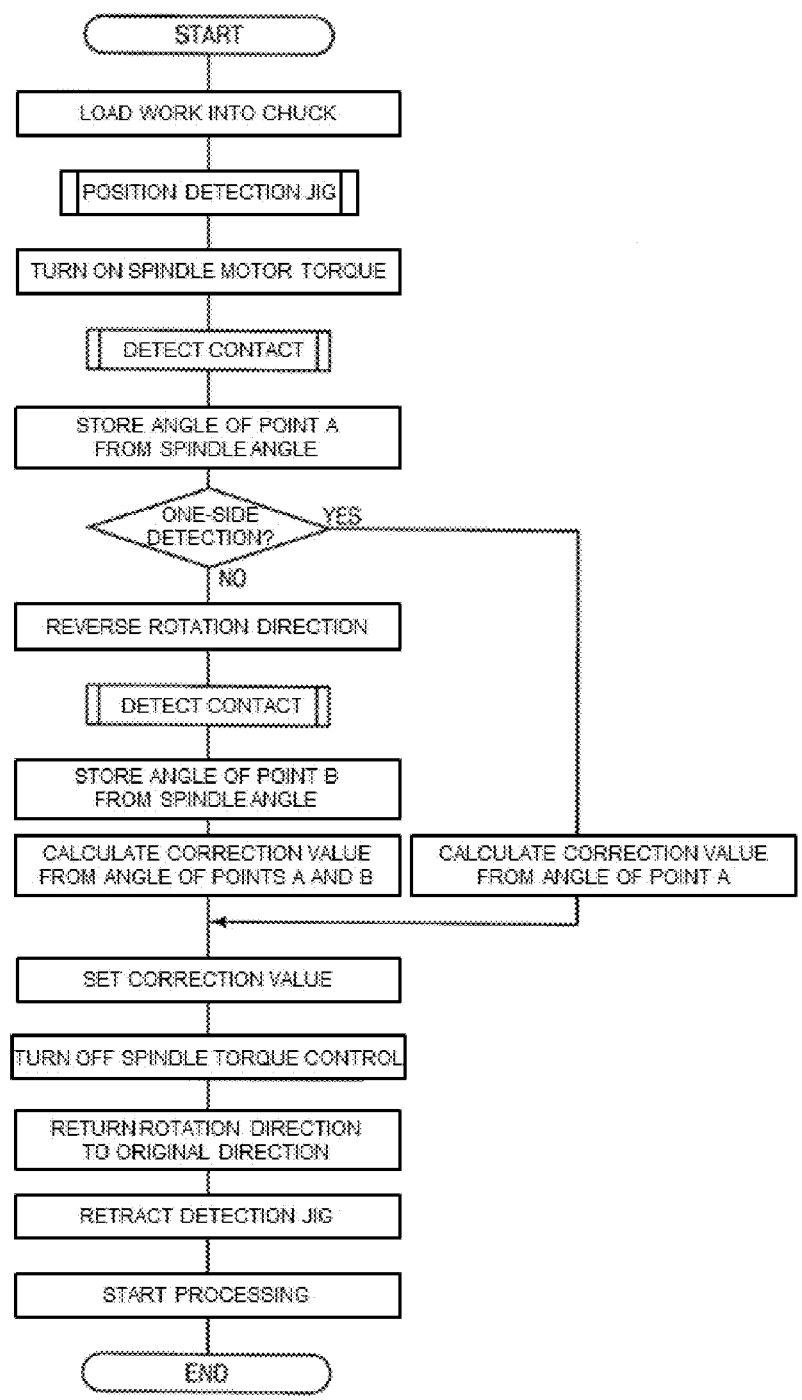
FIG. 5 is a flowchart showing a control procedure.
Figure 6:
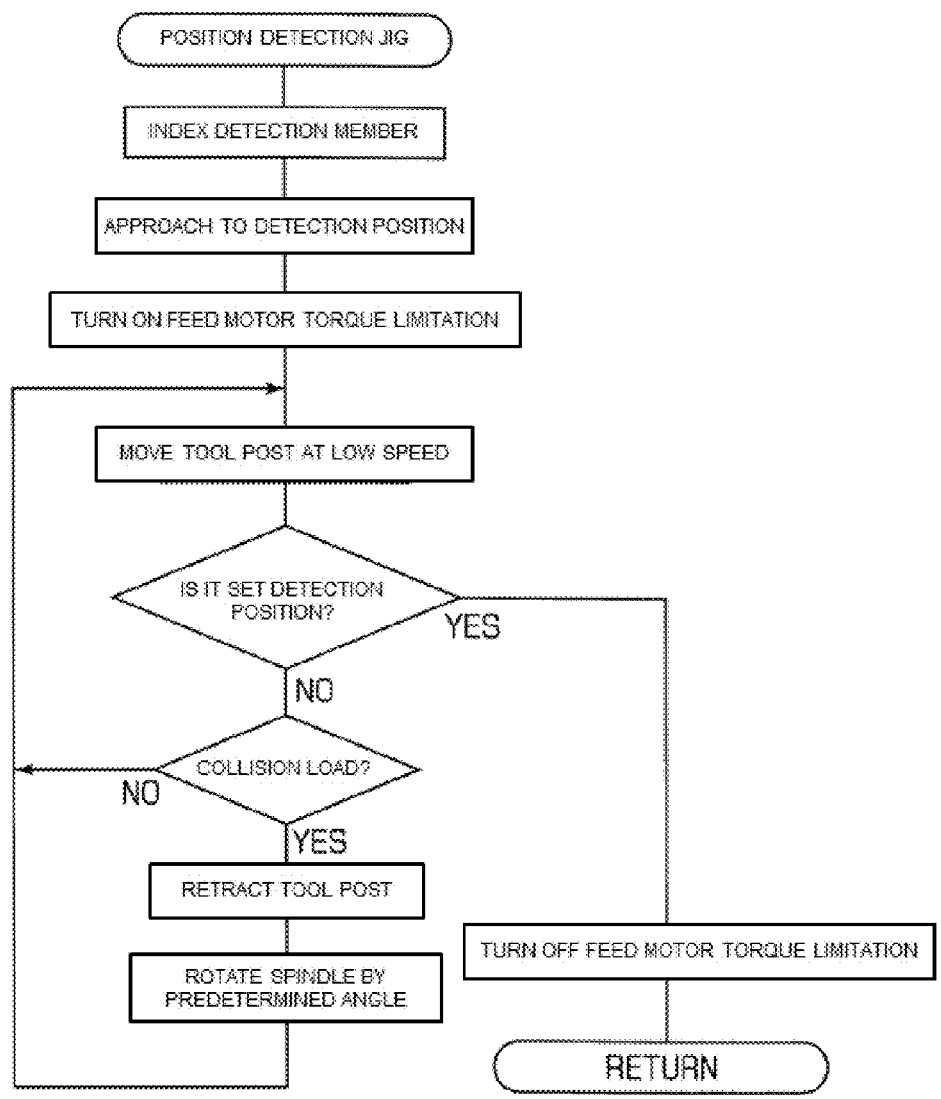
FIG. 6 is a subroutine showing a detection jig positioning operation.

Next, a work processing method using the spindle angle correction device shown in FIG. 1 will be described with reference to the flowcharts shown in FIGS. 5 to 7.

The cylindrical detection jig t is attached to the turret 18 of the lathe. When the work w is loaded into the chuck 17, a detection jig positioning subroutine shown in FIG. 6 is called. The detection jig positioning subroutine rotates the turret 18 to index the detection jig t toward the work w so that the front end of the detection jig t approaches the movement start position. The movement start position is set in a position which is closest to the work outside a dimension variation range in consideration of a variation in dimension of the work w. The tool post 12 approaches the detection position at a high speed.

Next, the torque of the feed motor 14 is limited and the tool post 12 is moved at a low speed so that the turret 18 faces the work w while the load of the feed motor 14 is monitored. When the feed motor load reaches the load set in the collision load setter before the tool post moves to the detection position, the detection jig (the tool post) is retracted to a position set in the retraction position setter, the spindle 11 is rotated by an angle set in the rotation angle setter, and the movement to the detection position is resumed.

Then, when the tool post moves to the detection position, the feed motor 14 is stopped to cancel the torque limitation of the feed motor. By the above-described operation, the detection jig t is positioned to the work detection position.

Figure 7:
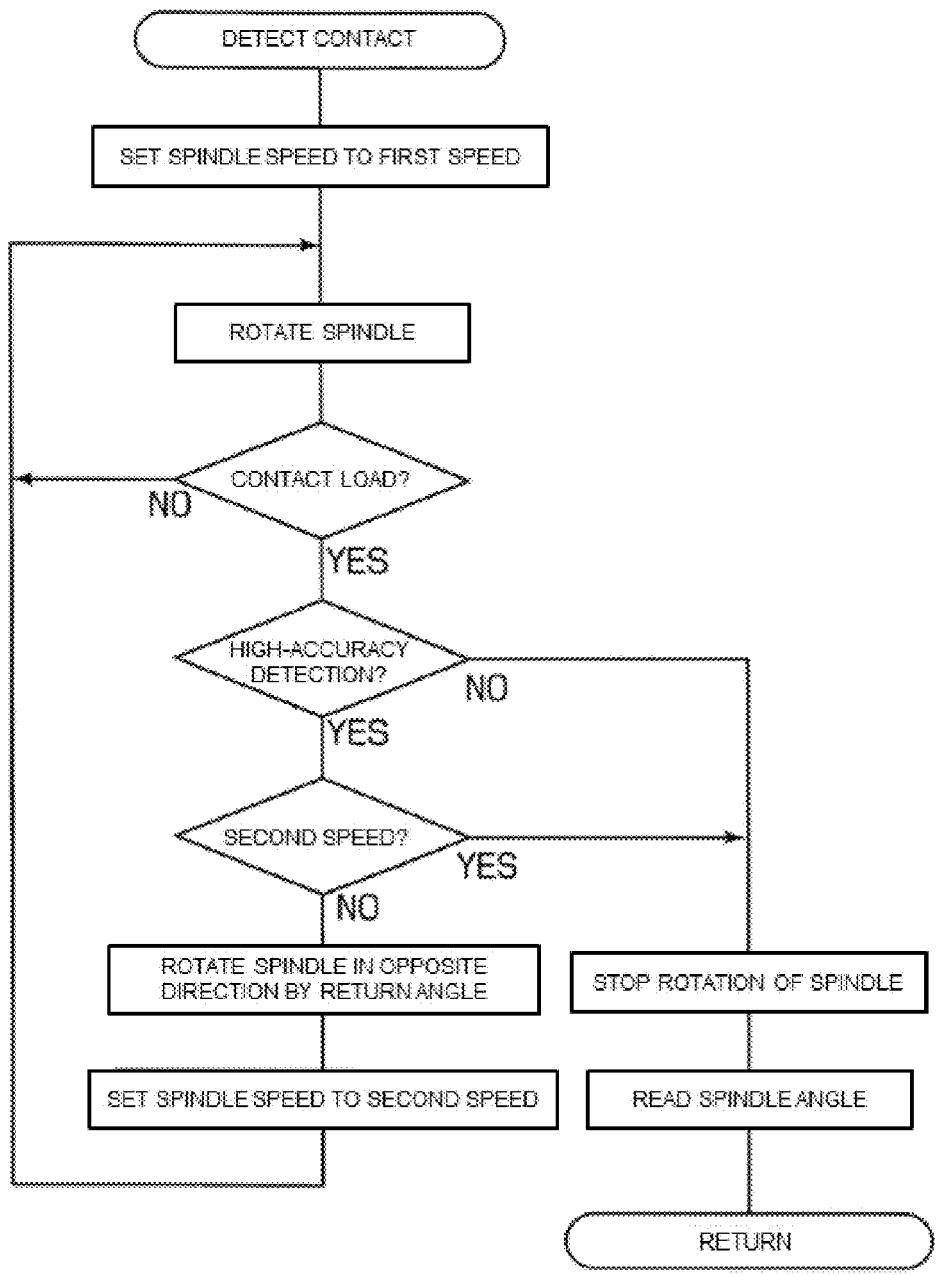
FIG. 7 is a subroutine showing a contact detection operation.

Next, a torque limitation is applied to the spindle motor 13, the rotation direction is set in a direction set in the spindle rotation direction setter, and the contact detection subroutine shown in FIG. 7 is called. The contact detection subroutine rotates the spindle in the set direction at the first speed until the load of the spindle motor reaches the load set in the contact load setter (the work and the detection jig come into contact each other) while monitoring the load of the spindle motor detected by the position deviation cs. If the normal detection is set in the detection type setter, the spindle motor is stopped when the contact is detected and the spindle angle is read.

Meanwhile, when the high-accuracy detection is set in the detection type setter, the spindle angle is returned by the angle set in the return angle setter and the spindle motor 13 is rotated at the speed set in the second speed setter. Then, when the contact is detected during the rotation at the second speed, the spindle motor is stopped and the control of FIG. 5 is performed again to read the spindle angle at a point A. When the one-side detection is set in the mode setter, the spindle angle correction value δ is calculated from the spindle angle and the reference angle which are read as above and is set in the correction value memory 23 of the NC machine. Then, the spindle torque limitation is canceled, the detection jig is retracted, and the process is started.

When the both-side detection is set in the mode setter, the read first spindle angle (the spindle angle of the point A) is stored in the angle memory. Then, the direction set in the rotation direction setter is reversed, the opposite contact is detected according to the same procedure, and the second spindle angle (the spindle angle of the point B) is read. Then, the correction value δ is calculated from the first spindle angle stored in the angle memory together with the second spindle angle and the reference angle which are read as above and is set in the correction value memory 23 of the NC machine. Then, the torque limitation of the spindle motor is canceled and the detection jig is retracted by indexing the tool 1 to starts the processing of the work w.

The above-described embodiment is an example in which the both-side detection and the one-side detection are selectable and the normal-accuracy detection according to the conventional method and the high-accuracy detection according to the invention are selectable. However, a machine which can perform any one of the one-side detection and the both-side detection does not need the mode setter and a machine which can perform only the high-accuracy detection can appropriately omit the control branching step shown in FIG. 7. Therefore, the device and the control sequence can be simplified.

EXPLANATIONS OF LETTERS OR NUMERALS

3: servo control device
4: spindle motor control device
5: spindle angle correction device
6: loader controller
13: spindle motor
14: tool post feed motor 31, 33: recessed portion
A, B: contact position
c, cx: position deviation
d: loading completion signal
e: positional determination instruction
f: tool post movement direction signal
g: collision detection signal
h: movement completion signal
i: low-speed rotation instruction
J: micro-speed rotation instruction
k: contact detection signal
m: high-accuracy detection instruction
t: detection jig
w: work
θ: spindle angle
δ: correction value

The invention claimed is:

1. A work processing method of a lathe which brings a detection jig corresponding to a rigid member attached to a turret of a tool post into contact with a work attached to a spindle by moving the tool post or rotating the spindle in the lathe, correcting a tool post position or a spindle angle based on a position of the tool post or an angle of the spindle at the time of the contact, and processes the work, wherein the contact is performed by a first contact operation of driving the tool post or the spindle at a first speed so that the work and the detection jig contact each other, a return operation of separating the detection jig and the work from each other by a predetermined distance after the first contact operation, and a second contact operation of bringing the work and the detection jig into contact each other at the same position at a second speed slower than the first speed after the separation and the correction is performed by obtaining a correction value based on the tool post position or the spindle angle at the time of the second contact.

2. The work processing method according to claim 1, wherein the detection jig is a cylindrical detection jig, the work is a work including a convex portion or a concave portion rotated by the rotation of the spindle, the first and second contact operations are contact operations between a cylindrical surface of the detection jig and a wall surface of the convex portion or the concave portion, and the correction value is a spindle angle correction value.

3. The work processing method according to claim 2, wherein the correction value is calculated from the spindle angle in which the contact between the work and the detection jig is detected after the rotation of the spindle in one direction and the spindle angle in which the contact between the work and the detection jig is detected after the rotation of the spindle in the opposite direction.

4. A spindle angle correction device of a lathe comprising:
a tool post movement member that includes a detection position setter setting a position of a detection jig during a work detection operation, a collision load setter, a retraction position setter setting a tool post retraction position during a retry after a detection of a collision, and a rotation angle setter setting a spindle rotation angle during the retry;
a spindle rotation member that includes a first speed setter, a second speed setter, and a return angle setter;
a contact detection member that includes a contact load setter; and
a correction value calculation unit which calculates a spindle angle correction value for a processing operation based on a spindle angle when a contact is detected,
wherein the tool post movement member moves a tool post in an NC machine to a work detection position when receiving a work supply completion signal,
wherein the spindle rotation member rotates a spindle at a speed set in the first speed setter when receiving a movement completion signal from the NC machine in corporation with the contact detection member, rotates the spindle at a speed set in the second speed setter after rotating the spindle back by an angle set in the return angle setter when a spindle motor load reaches a load set in the contact load setter during the rotation, and outputs a contact detection signal when the spindle motor load reaches the load set in the contact load setter,
wherein the correction value calculation unit calculates the spindle angle correction value based on the spindle angle when the contact detection signal is output and sets the spindle angle correction value to a correction value memory of the NC machine, and
wherein the tool post movement member moves the tool post to a position set in the detection position setter by rotating the spindle by an angle set in the rotation angle setter after retracting the tool post to a position set in the retraction position setter whenever a feed motor load of the tool post reaches a load set in the collision load setter during the movement of the tool post instructed in the NC machine.

5. A complex lathe comprising:
the spindle angle correction device according to claim 4.

* * * * *